UNITED STATES PATENT OFFICE.

JOHN H. QUINE, OF ROCHESTER, NEW YORK.

PROCESS OF TREATING BRAN AND A PRODUCT OBTAINED THEREBY.

1,018,441. Specification of Letters Patent. Patented Feb. 27, 1912.

No Drawing. Application filed July 29, 1907. Serial No. 386,121.

*To all whom it may concern:*

Be it known that I, JOHN H. QUINE, of Rochester, in the county of Monroe and State of New York, have invented certain new and useful Improvements in the Process of Treating Bran and a Product Obtained Thereby; and I do declare the following to be a full, clear, and exact description of the same.

My present invention relates to the recovery from cereals or grains of the mineral matter, which is usually discarded in the manufacture of flour, in such a form that it may be conveniently added to flour to enrich the nutritive qualities of bread, pastry or other articles in which it is employed as an ingredient.

It is well known that wheat flour and other flour which is largely used in the manufacture of white bread, when produced by the usual milling process, is deficient in mineral matter. This is due to the separation of the bran, which is richest in mineral matter, from the flour, so that the latter seldom contains more than one-half of one per cent. of such mineral matter. Heretofore there has been an objection to the use of entire wheat flour and other flours containing all or a portion of the bran in the whole grain on account of its dark color and the comparatively large proportion of woody fiber consumed with the flour which has been found to cause an irritation of the intestines.

In the present invention I provide an improved method of treating the bran derived from the grain in the process of manufacturing flour, whereby a new product containing the valuable mineral matter in the bran, consisting chiefly of the phosphates of sodium, potassium, calcium, magnesium and iron, may be extracted and the woody fiber discarded.

As is well known, part of the mineral matter contained in bran is soluble in water, and part is insoluble in that menstruum. I, therefore, first extract the water-soluble portion, as for example, by heating one hundred (100) pounds of clean bran, free from dust, with about seventy-five (75) gallons of water. The mixture is preferably boiled in a steam-jacketed kettle, until the liquid has evaporated to about fifty (50) gallons in volume. By this treatment, the soluble phosphates of sodium and potassium, together with starch and gluten, are extracted, and the cerealin, an objectionable ferment found in bran, is destroyed. The liquid is then strained, and the solution containing the water dissolved constituents set aside. The remaining portion of bran contains the insoluble phosphates of calcium, magnesium and iron, together with a small percentage of other mineral matter, besides organic matter. To this is added an acid solvent and water, in this instance forty (40) gallons of water, more or less, and one pound of hydrochloric acid. I do not limit myself to hydrochloric acid, as other acids, such as lactic and phosphoric, may be used, but I prefer the former. The acid mixture is now heated, preferably boiled for two or three hours, and then strained, and the solid matter washed with warm water until the washings show no acid reaction. The washings are added to the separated liquid matter, and set aside. Hydrochloric acid being a solvent for the phosphates of calcium, magnesium and iron, and for the other insoluble mineral matter in bran, and also for the starchy matter contained therein, the acid filtrate contains practically all the extractive matter left in the bran after the treatment with water alone. The liquid containing the acid dissolved constituents, should now be carefully neutralized with an alkali, preferably sodium hydrate, resulting, if hydrochloric acid be the solvent, in the formation of sodium chlorid or common salt, which is entirely unobjectionable, and which is used in the process of bread-making. To extract the gluten and other organic matters either from the bran or from that portion left on the filter after the acid treatment, the material may be mixed with sufficient water (say 40 gals.) and a weak alkaline solution, preferably of sodium hydrate (not sufficient to dissolve the cellulose or woody fiber, say one pound of a ten per cent. solution), and heated, preferably boiled for one hour. The liquid may then be strained and the separated alkaline dissolved constituents exactly neutralized with an acid, preferably hydrochloric acid. The marc is now discarded and the dissolved constituents, or the resultant extracts from the foregoing operations, after neutralization, are combined, and if desired, the whole carefully evaporated at a low temperature, preferably *in vacuo,* to dryness, and the product finally reduced to powder. The resultant product contains all the valuable extractive matter of the bran, both organic and inorganic, free from the insoluble and irritating woody fiber, and is in a condition to be completely assimilated by the human system. It may be preserved indefinitely, to be added to flour, dough or pastry to enrich it.

The approximate composition of the product is as follows:

| | |
|---|---|
| Moisture | 12.00 p. c. |
| Nitrogenous substances | 18.00 p. c. |
| Fat | 5.00 p. c. |
| Carbohydrates | 55.00 p. c. |
| Ash | 10.00 p. c. |
| | 100.00 |

Of the ash, approximately 85% consists of the phosphates of potassium, sodium, magnesium, calcium, and iron, together with traces of manganese and calcium fluorid, and silica. The balance, 15%, consists of sodium chlorid.

I do not desire to limit myself to extraction at the boiling temperature of water, as a lower temperature may be found more suitable in practice.

In milling grain, such as wheat, the yield of bran is about thirty-eight pounds from every two hundred pounds of grain, the nutrient qualities of which bran may be replaced by adding to every two hundred pounds of flour about ten pounds of the above described product. While it is more convenient to add the latter to the flour, it will be understood that it may be added after dough has been made therefrom. In the latter case the quantity of the product added to the dough should be proportional to the quantity of flour employed, that is, the quantity of the product should be approximately equal to the quantity of mineral matter which would be obtained from treatment of the bran obtained from the grain yielding of flour used in making the batch of dough. This proportion of mineral matter would be in the ratio of about one part to every twenty parts of flour.

By destroying the cerealin the chemical conversion of the starch which occurs and is evidenced in bread, when cerealin is present, by its sticky or soggy nature, is obviated.

Bread, pastry or other articles made from flour enriched by the product I have described, contains all of the valuable constituents of the whole grain and possesses the elements essential to nourish the human body without containing the objectionable parts of the bran.

I claim as my invention—

1. A concentrated extract of bran containing the constituents of bran soluble in water and dilute acid, and consisting chiefly of carbohydrates and albuminoids, and an edible salt formed from the solvent.

2. A concentrated extract of bran containing the constituents of bran soluble in dilute acid and consisting chiefly of carbohydrates and albuminoids and a salt formed from the solvent.

3. A concentrated extract of bran containing the constituents of bran soluble in dilute hydrochloric acid, and consisting chiefly of carbohydrates and albuminoids, and sodium chlorid formed from the solvent.

4. A concentrated extract of bran containing the constituents of bran soluble in water, dilute acid and dilute alkali, respectively, consisting chiefly of soluble carbohydrates and albuminoids and containing approximately 10 per cent of ash.

5. The process of extracting bran which consists in acting on it alternately with water, dilute acid and dilute alkali, neutralizing the reagents and concentrating the mixed extracts.

6. In a process of recovering valuable constituents from bran the steps which consist in subjecting the bran to water to dissolve certain constituents thereof, separating the liquid from the bran thus treated, subjecting the solid matter to an acid solution, neutralizing the solution, separating the liquid from the said material and combining the separated liquids.

7. In a process of treating bran, the steps which consist in extracting certain of the constituents of bran by water, then extracting other constituents by an acid solution, neutralizing the acid in this extract, and combining the extracts.

8. The process of treating bran which consists in extracting certain of the constituents of bran by water, extracting other constituents by an acid, extracting still other constituents by an alkali, and combining the extracts.

9. The process of treating bran which consists in extracting certain of the constituents of bran by water, extracting other constituents by a solution of hydrochloric acid, neutralizing the acid of this extract by sodium hydrate, and combining the extracts.

10. The process of treating bran which consists in extracting certain of the constituents of bran by water, then extracting other constituents by an acid solution, neutralizing the acid in this extract, extracting other constituents by an alkaline solution, neutralizing this extract with an acid, and combining the extracts.

11. The process of recovering valuable constituents from bran which consists in subjecting the bran to water to dissolve certain constituents thereof, separating the liquid from the bran thus treated, subjecting the residuum to an acid solution, separating the liquid from the said material, combining the separated liquids, evaporating the combined liquids to dryness, and reducing the product to a powder.

12. The process of recovering valuable constituents from bran which consists in subjecting the bran to water to dissolve certain constituents thereof, separating the liquid from the bran thus treated, subjecting the residuum to an acid solution, separating the liquid from the said material, subjecting the second residuum to an alkaline solution, separating the liquid from said material, combining the separated liquids, evaporating the combined liquids to dryness, and reducing the product to a powder.

13. A dried extract of bran from which insoluble fibers have been eliminated containing soluble constituents of bran, and an edible salt formed from the solvent.

JOHN H. QUINE.

Witnesses:
H. H. SIMMS,
RUSSELL B. GRIFFITH.